United States Patent
Karbassi

(10) Patent No.: US 6,907,302 B2
(45) Date of Patent: Jun. 14, 2005

(54) PDA MONITORING AND DIAGNOSTIC SYSTEM FOR INDUSTRIAL CONTROL

(75) Inventor: Hassan Karbassi, Delafield, WI (US)

(73) Assignee: Kar-Tech, Inc., Delafield, WI (US)

( * ) Notice: Subject to any disclaimer, the term of this patent is extended or adjusted under 35 U.S.C. 154(b) by 259 days.

(21) Appl. No.: 10/236,843

(22) Filed: Sep. 6, 2002

(65) Prior Publication Data

US 2003/0074086 A1 Apr. 17, 2003

Related U.S. Application Data

(60) Provisional application No. 60/329,039, filed on Oct. 12, 2001.

(51) Int. Cl.$^7$ .............................................. G05B 19/18
(52) U.S. Cl. ............................ 700/65; 700/19; 700/20; 700/53; 700/66; 709/200; 709/203; 709/217; 709/219
(58) Field of Search ....................... 700/2–3, 5, 17–20, 700/53, 65–66, 83–89; 709/200, 203, 208, 209, 217, 219

(56) References Cited

U.S. PATENT DOCUMENTS

| | | | |
|---|---|---|---|
| 5,293,900 A | | 3/1994 | Karbassi et al. ............. 197/554 |
| 5,389,752 A | | 2/1995 | Karbassi ................... 200/61.85 |
| 5,781,776 A | * | 7/1998 | Johnston et al. ............. 717/130 |
| 6,282,454 B1 | * | 8/2001 | Papadopoulos et al. ....... 700/83 |
| 6,529,824 B1 | * | 3/2003 | Obradovich et al. ......... 701/208 |
| 2002/0068983 A1 | * | 6/2002 | Sexton ........................... 700/2 |
| 2002/0147503 A1 | * | 10/2002 | Osburn, III ..................... 700/9 |
| 2002/0174010 A1 | * | 11/2002 | Rice, III ....................... 705/14 |
| 2003/0013430 A1 | * | 1/2003 | Skinner et al. .............. 455/412 |
| 2003/0023671 A1 | * | 1/2003 | Abdulrahiman et al. .... 709/203 |
| 2003/0061274 A1 | * | 3/2003 | Lo ............................. 709/203 |

FOREIGN PATENT DOCUMENTS

EP            1215549 A2 *  6/2002    ........... G05B/19/05

\* cited by examiner

Primary Examiner—Ramesh Patel
(74) Attorney, Agent, or Firm—Whyte Hirschboeck Dudek SC

(57) ABSTRACT

A system and software for controlling output devices used in association with machinery is disclosed. The system includes a control module which may be connected to a personal digital assistant (PDA), personal pocket PC, personal computer, organizer, cell phone, or other data storage device. The data storage device has programmed within it particularized manufacturer information for various input devices and output devices available on the market. The system allows an operator to select a particular manufacturer, as well as product information, including product model number and operating parameters. The machine can then be calibrated such that the input device being used, as well as the output device manufacturer information, is used to dynamically adjust, monitor or perform diagnostics on the machine. The system allows for on-site calibration of the machine controllers. The invention contemplates the use of any output device used with the operation of the machine or any input device used to input information or operation instructions to the machine. The software may be programmed into any personal electronic device or may be connected to a driver or controller associated with the machine to be regulated.

20 Claims, 14 Drawing Sheets

PDA MONITORING AND DIAGNOSTIC SYSTEM FOR INDUSTRIAL CONTROL

RELATED APPLICATION

This application claims priority of U.S. Provisional Patent Application No. 60/329,039 filed on Oct. 12, 2001.

BACKGROUND OF THE INVENTION

The invention relates generally to control systems used in industrial applications. More particularly, the invention relates to control systems that can store programs and maintain preset specifications for control of input and output devices used in a particular industrial application.

In industrial settings, including manufacturing and construction, it is common to utilize control systems that regulate such items as valves, motors, hydraulics, circuits, etc. These items, referred to as output devices are operated by, for example, a worker using an input device such as a joystick, such as is described in U.S. Pat. No. 5,293,900 and U.S. Pat. No. 5,389,752, the teachings of which are herein incorporated by reference. Other devices may include potentiometers, sensors, etc. Usually, a driver/controller is used to communicate between the input device and the output device, thereby ensuring appropriate operation of the output device. The driver/controller is specifically selected to effectively regulate power to the particular output device. That is, each output device will necessitate a different type of device driver/controller.

Moreover, variability between different manufacturers of input and output control devices has to be taken into consideration when developing a control system. The parameters for various input and output devices vastly differ among manufacturers. For example, currently for the application of a device using a current regulated valve driver or DC motor, the user is required to predetermine the specifications of the output component and the specified input device before fitting the controls. This individual configuration scenario for each input and output device is a very time-consuming and tedious task. Consequently, the costs of developing such a control system are increased. Therefore, there is a need for a system in which variations in the input and output control devices can be taken into account to accurately configure a control system based on the particulars of the control input and output devices.

SUMMARY OF THE INVENTION

The present invention provides for a control system that can be easily configured. With the use of this control device and storage of the different input and output device parameters and their specifications, a person can configure and maintain preset specifications easily and quickly. This allows user to purchase one model and change to different manufacturer specification by selecting these devices, as the program will automatically adjust and maintain the appropriate values in each application that overcomes the aforementioned problems.

In accordance with one aspect of the invention, a method for controlling an output device is disclosed. The method includes programming a data and communication storage device to receive, store and select operational parameters of a plurality of control input devices and a plurality of output devices; programming the data and communication storage device to receive, store and select identification parameters of the control input devices and the output devices; and programming the data and communication storage device to calibrate a driver/controller based on the operational parameters and the identification parameters of the input control devices and the output devices.

In another aspect of the invention, a system for controlling an output device usable with machinery is disclosed. The system includes a data storage and communications device, a control input device, and a control output device. A driver-controller is connected to the data storage and communications device, the control input device and the control output device for driving and controlling the control output device. The data storage and communication device can dynamically change data with respect to the control input device and the control output device based on desired operation.

Various other features, objects and advantages of the present invention will be made apparent from the following detailed description and the drawings.

BRIEF DESCRIPTION OF THE DRAWINGS

Embodiments of the invention are disclosed with reference to the accompanying drawings and are for illustrative purposes only. The invention is not limited in its application to the details of construction, or the arrangement of the components, illustrated in the drawings. The invention is capable of other embodiments or of being practiced or carried out in other various ways. Like reference numerals are used to indicate like components.

The drawings illustrate at least one mode presently contemplated for carrying out the invention.

In the drawings:

FIG. 1 is a schematic block diagram illustrating an output device control system in accordance with one aspect of the invention;

FIG. 2 illustrates the software of the present invention installed in a personal digital assistant (PDA);

FIG. 3 illustrates initiation of the software in accordance with one aspect of the present invention;

FIG. 4 illustrates a security matter associated with the software of the present invention;

FIG. 5 illustrates an identification parameter of a control input device using the present invention;

FIG. 6 illustrates an identification parameter selected from a database of known manufacturers as part of the present invention;

FIG. 7 illustrates a selection of an identification parameter selected from stored values for valve types of a given manufacturer for use in the present invention;

FIG. 8 illustrates a selection of a pulse with modulation channel in operation of the software of the present invention;

FIG. 9 illustrates the selection menu of operational parameters for use of the software in the present invention;

FIG. 10 illustrates the input of a particular operational parameter in the present invention;

FIG. 11 illustrates the input of another particular operational parameter in the present invention;

Figure 12:
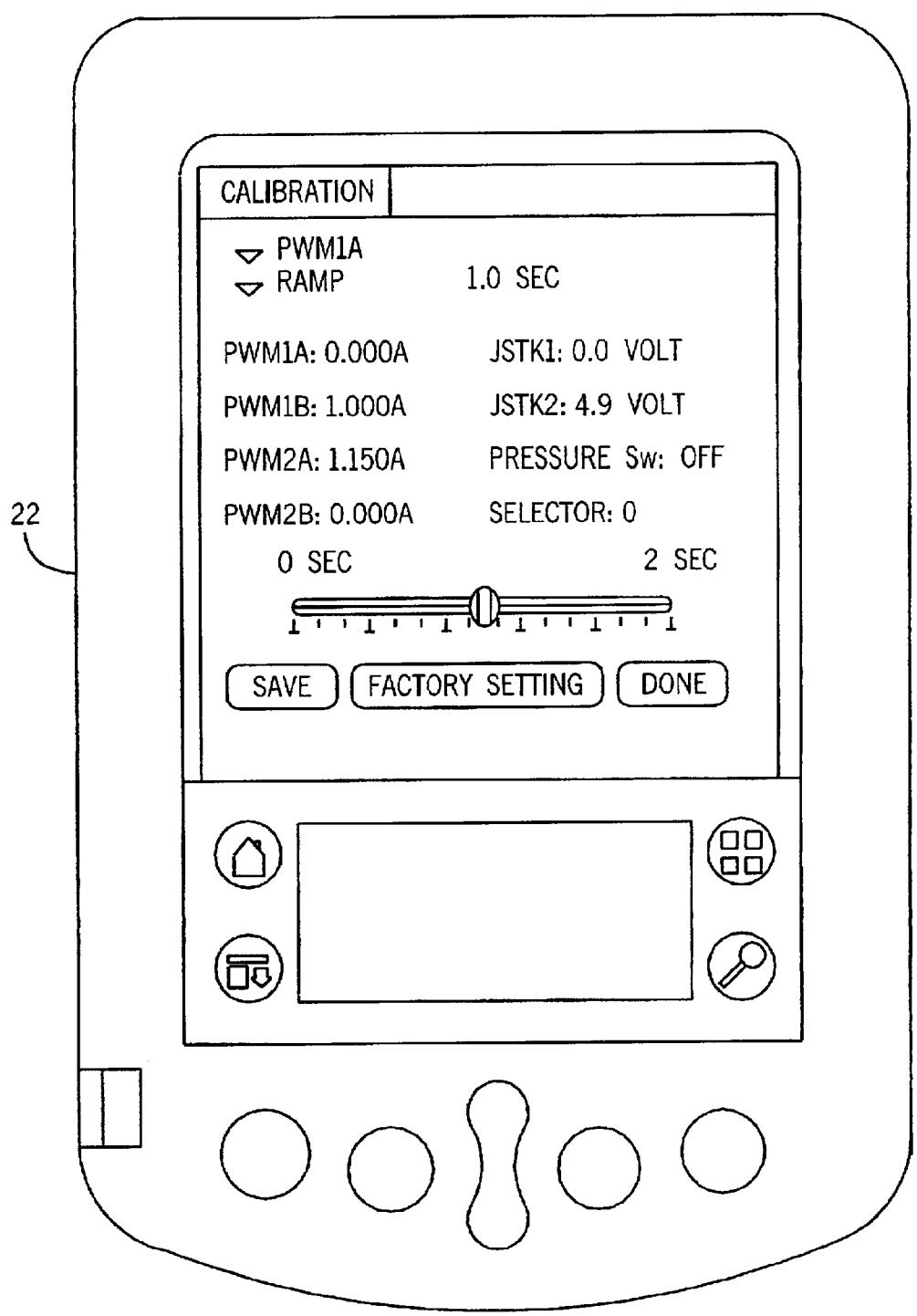
Figure 13:
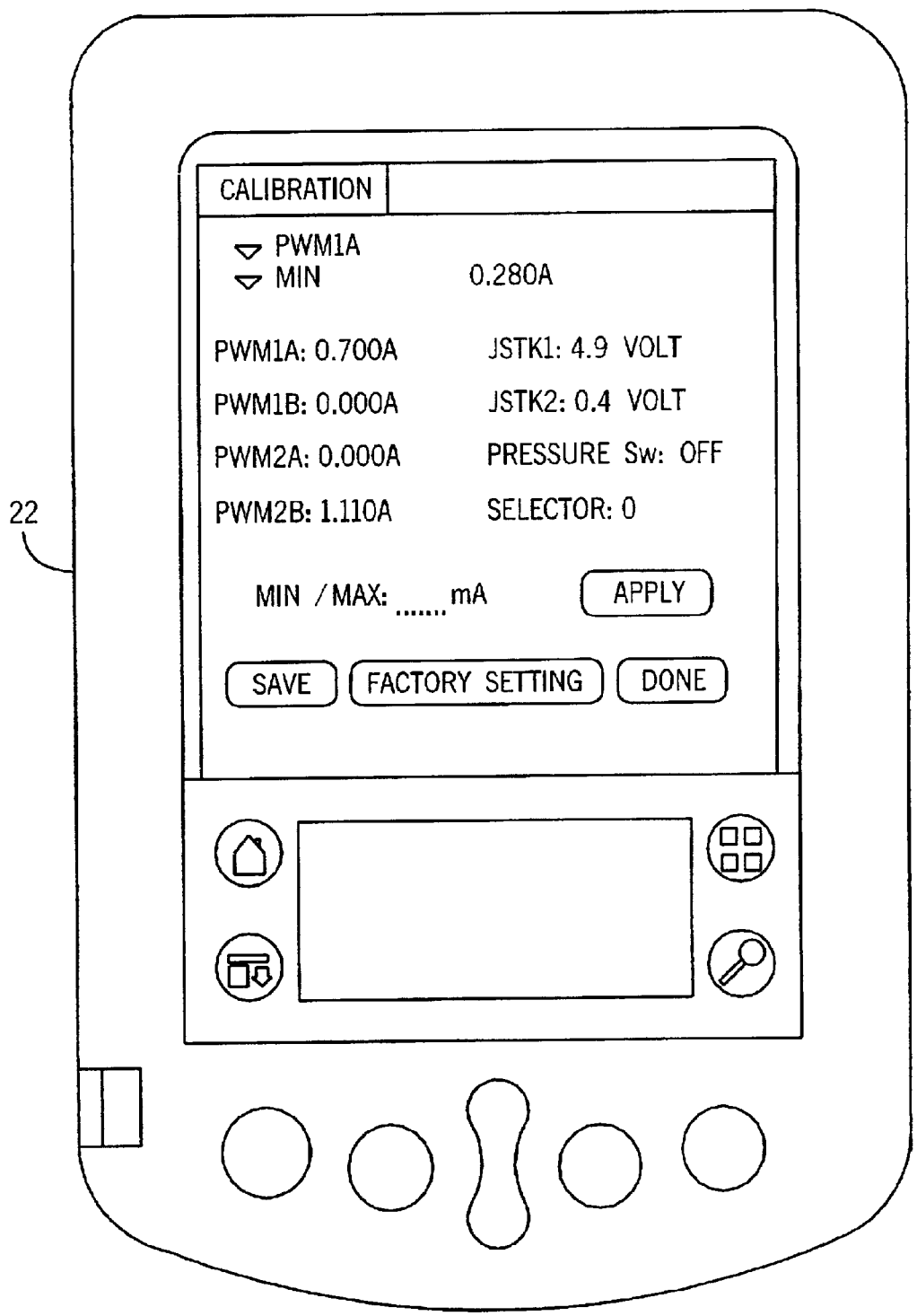
Figure 14:
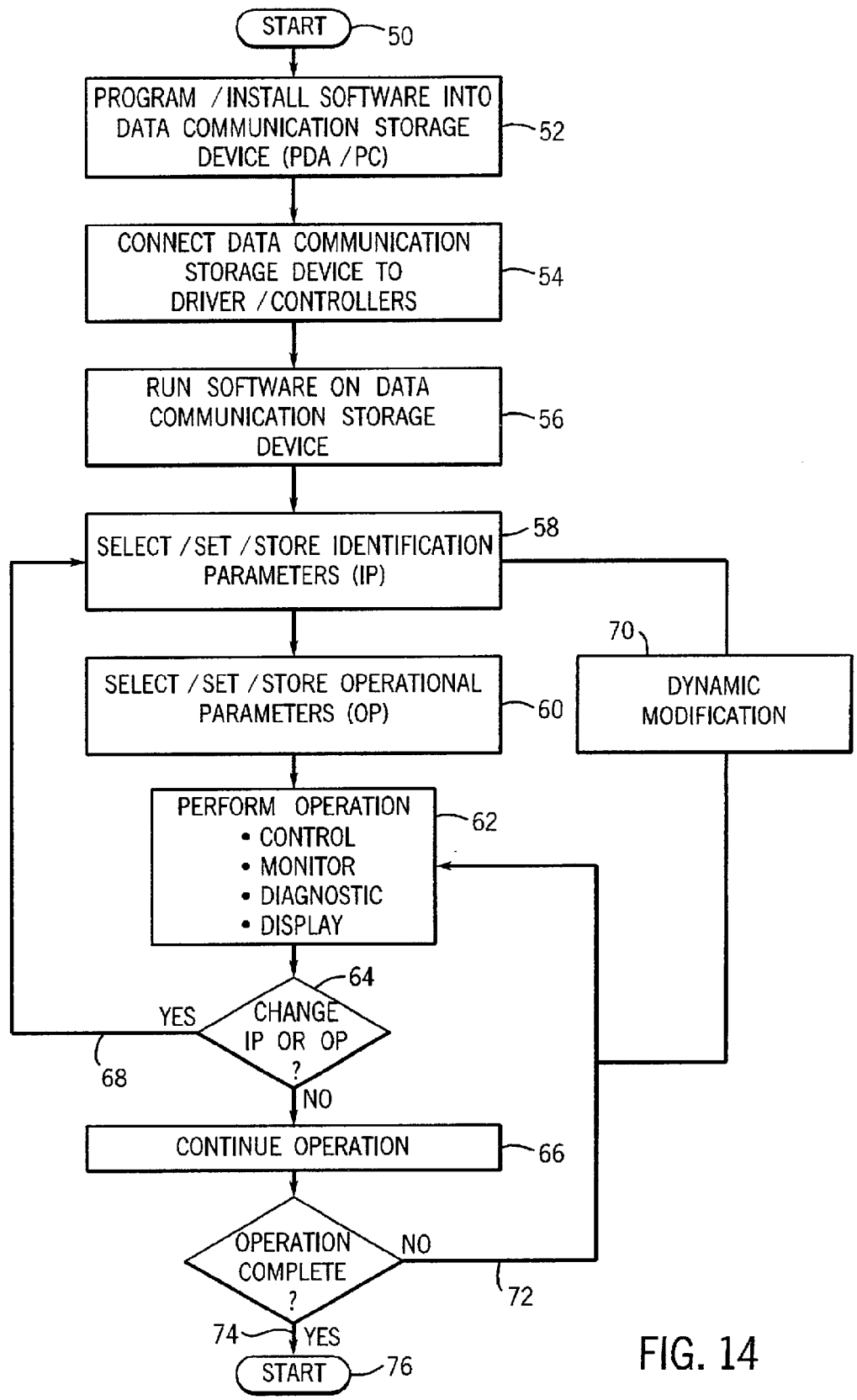

FIG. 12 illustrates the input of another particular operational parameter in the present invention;

FIG. 13 illustrates operational parameter information in accordance with the present invention; and FIG. 14 is a flowchart illustrating one methodology associated with the present invention.

DETAILED DESCRIPTION OF THE PREFERRED EMBODIMENTS

The present invention is described as being used with conventional application equipment, such application equipment's usage being known to those of skill in the art. Although the invention is described below in the context of controlling a valve with a joystick type input device (e.g., a valve control assembly), those skilled in the art will recognize that the invention can be employed with, and has applicability to, many different processes.

Figure 1:
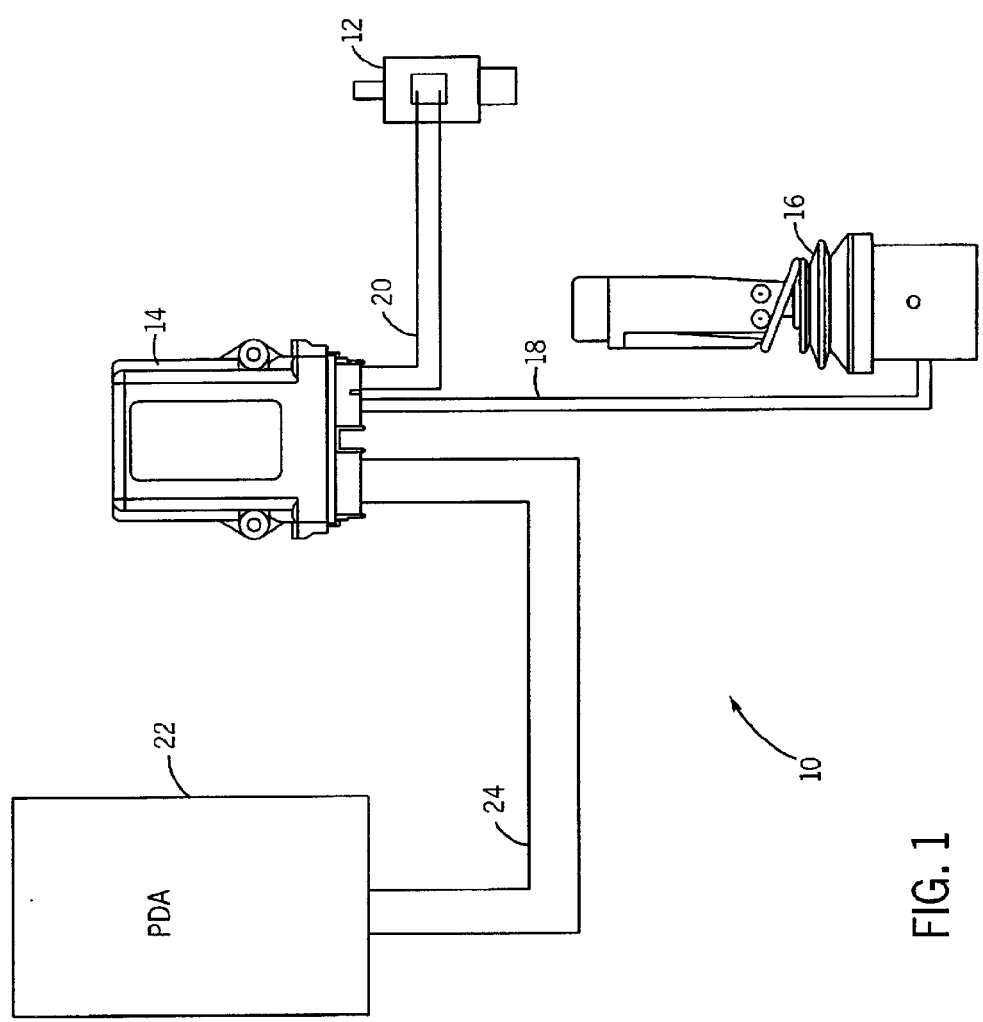

FIG. 1 is a schematic block diagram illustrating an output device control system in accordance with one aspect of the invention. The output device control system is identified generally by the numeral 10. System 10 is used to control output device or output control device 12. Output control device may be any desired device, such as is used in manufacturing processes, construction processes or other device that is desired to be actuated as part of an overall physical process. Control output device 12 may include, for example, hydraulic valves, pneumatic valves, DC motors or electric circuits, although any suitable output device is contemplated to be within the scope of the present invention. Generally, output control device 12 will have a driver/controller 14 to receive control signals from input devices 16 via connection 18 and transmit the regulated signals via connection 20 to the output control device 12. Such control can include, for example, current regulation, and voltage regulation. Input control device 16 may be any generally suitable input control device, and may include such input devices as joysticks, pressure transducers, potentiometers, or sensors. Input control device 16 as shown is a joystick style where an operator physically manipulates the joystick in order to ultimately control the output control device 12.

Because of the variety of input control devices and output control devices that may be used, the present invention includes a data storage and communications device 22 which can be connected via connection 24 to, for example, driver controller 14. Data storage and communication device 22, in the present embodiment is a personal digital assistant or PDA such as is manufactured by Palm, Compaq and other manufacturers. Any device that is capable of programming data storage and communications is considered to be within the scope of the present invention, and may include personal communicators, personal computers, PC's, telephones or telephonic devices, or a combination of one or more of any of the preceding. Data storage and communication device 22 is programmed to provide identification parameters and operational parameters of the input control device 16 and the output control device 12.

Figure 2:
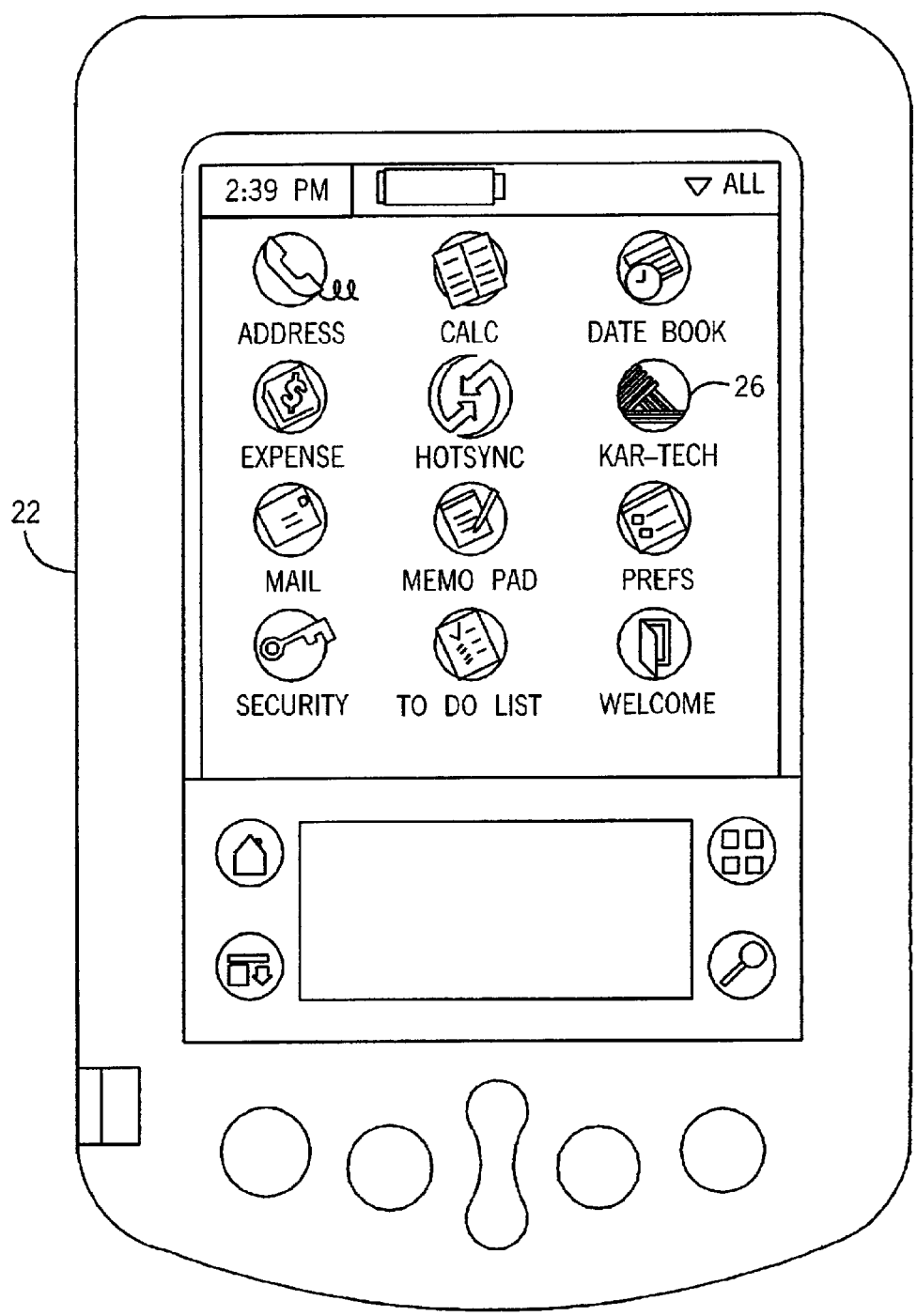

FIG. 2 illustrates the software of the present invention installed in a personal digital assistant (PDA). In FIGS. 2 through 13, the personal digital assistant is used as the data storage and communication device 22. In the embodiment shown, the software associated with the present invention is programmed into the operating system of the data storage and communication device 22, and it shows as an icon 26, in this case represented by the symbol and text for Kartech. By selecting icon 26, the program associated with the present invention can be initiated.

Figure 3:
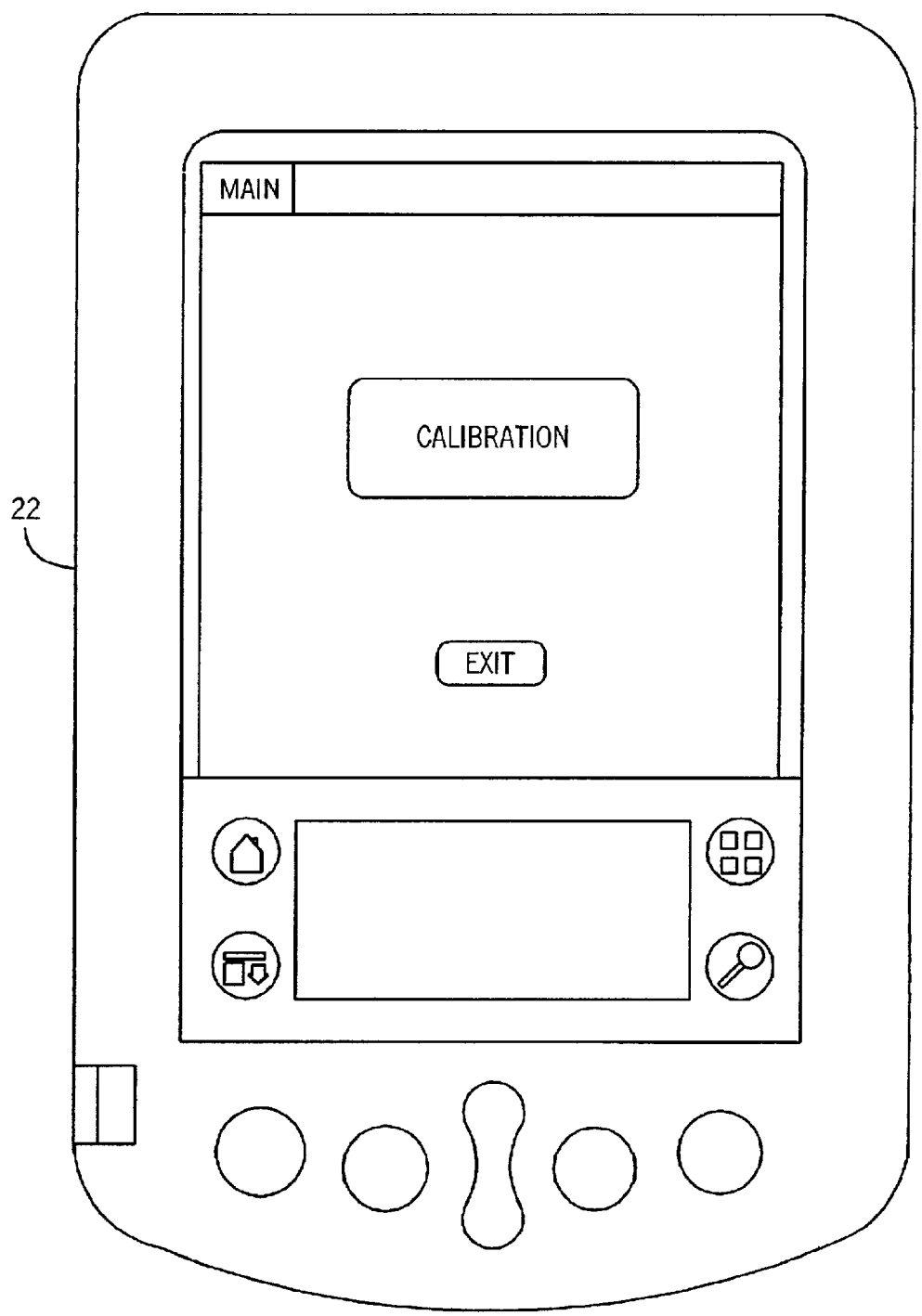

FIG. 3 illustrates initiation of the software in accordance with one aspect of the present invention. Upon initiation of the software, data stored in communication device 22 can display a calibration screen which allows the user to calibrate the program for various input and output devices.

Figure 4:
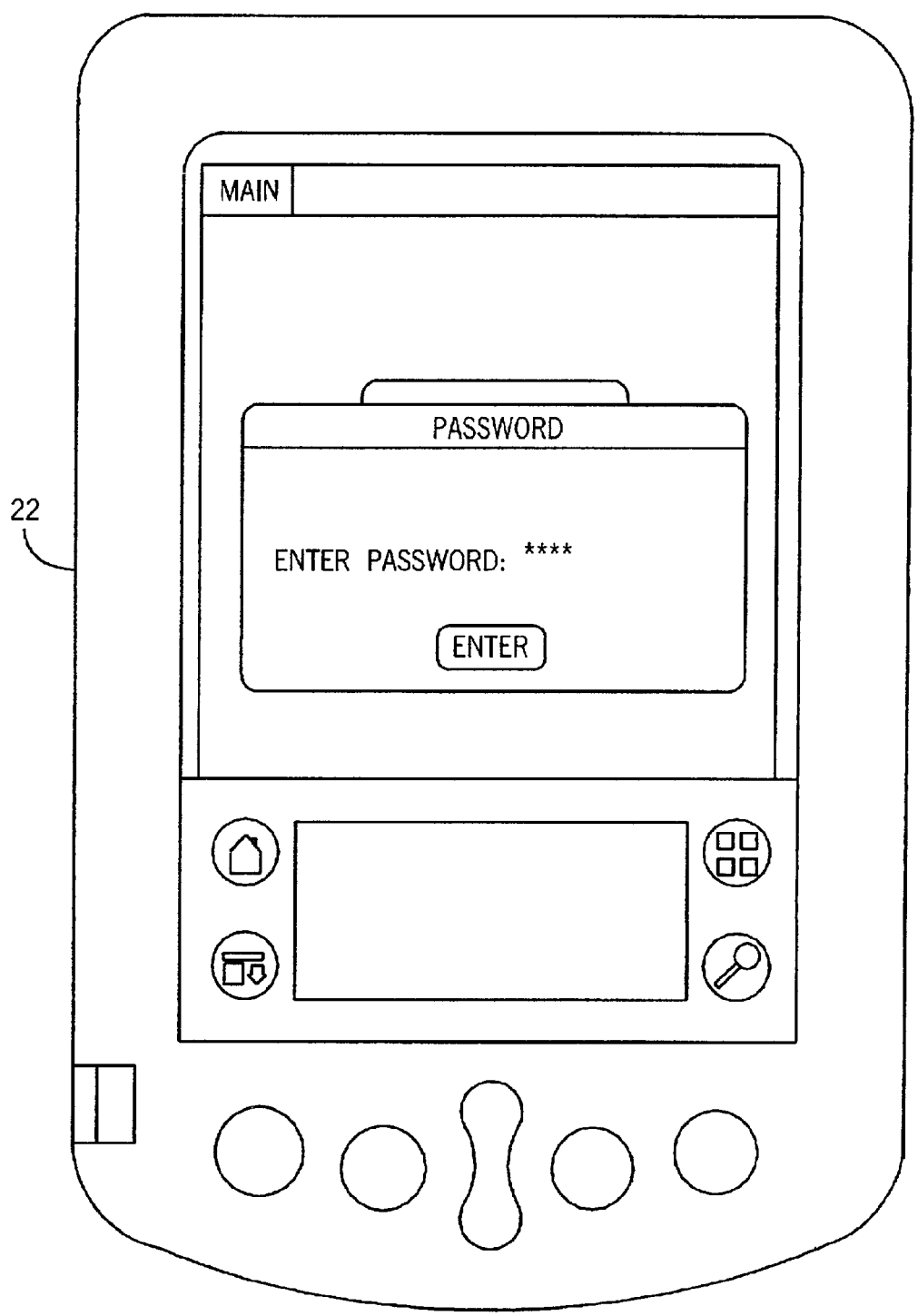

FIG. 4 illustrates a security matter associated with the software of the present invention. Because the present invention is used and can be used to dynamically adjust sensitive and/or critical operations, data storage and communication device 22 may be password protected in order to prevent the unauthorized entering and/or changing of input devices, output devices, identification parameters and operational parameters. Successful entering of a password allows the user to continue in the calibration process.

Figure 5:
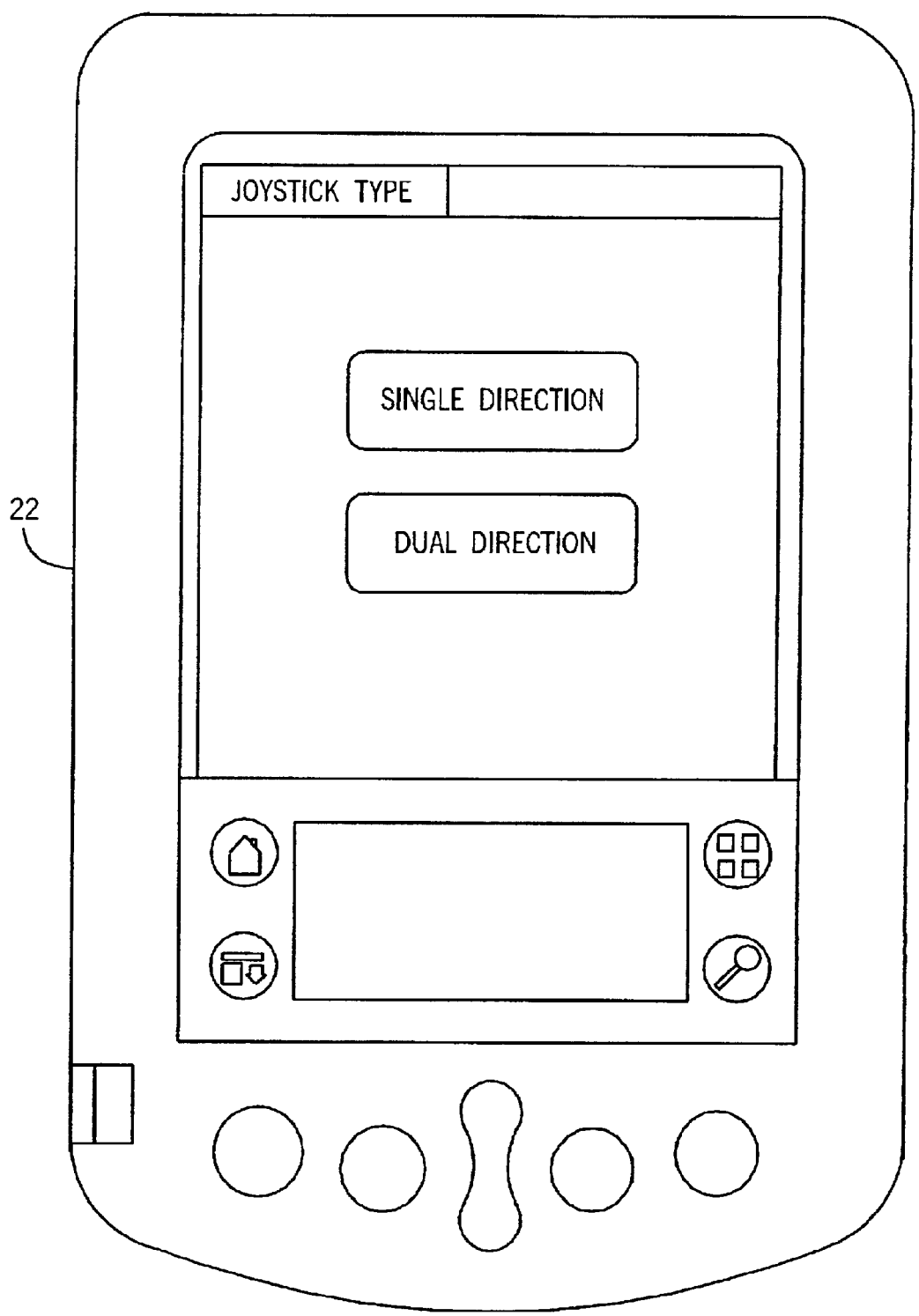

FIG. 5 illustrates an identification parameter of a control input device using the present invention. In FIG. 5, the user is directed to select on the data storage and communication device 22 the type of control input device to be used, in this case selecting from a single-direction and a dual-direction type of input. Such single-direction or dual-direction types may be considered identification and/or operational parameters for the control input device.

Figure 6:
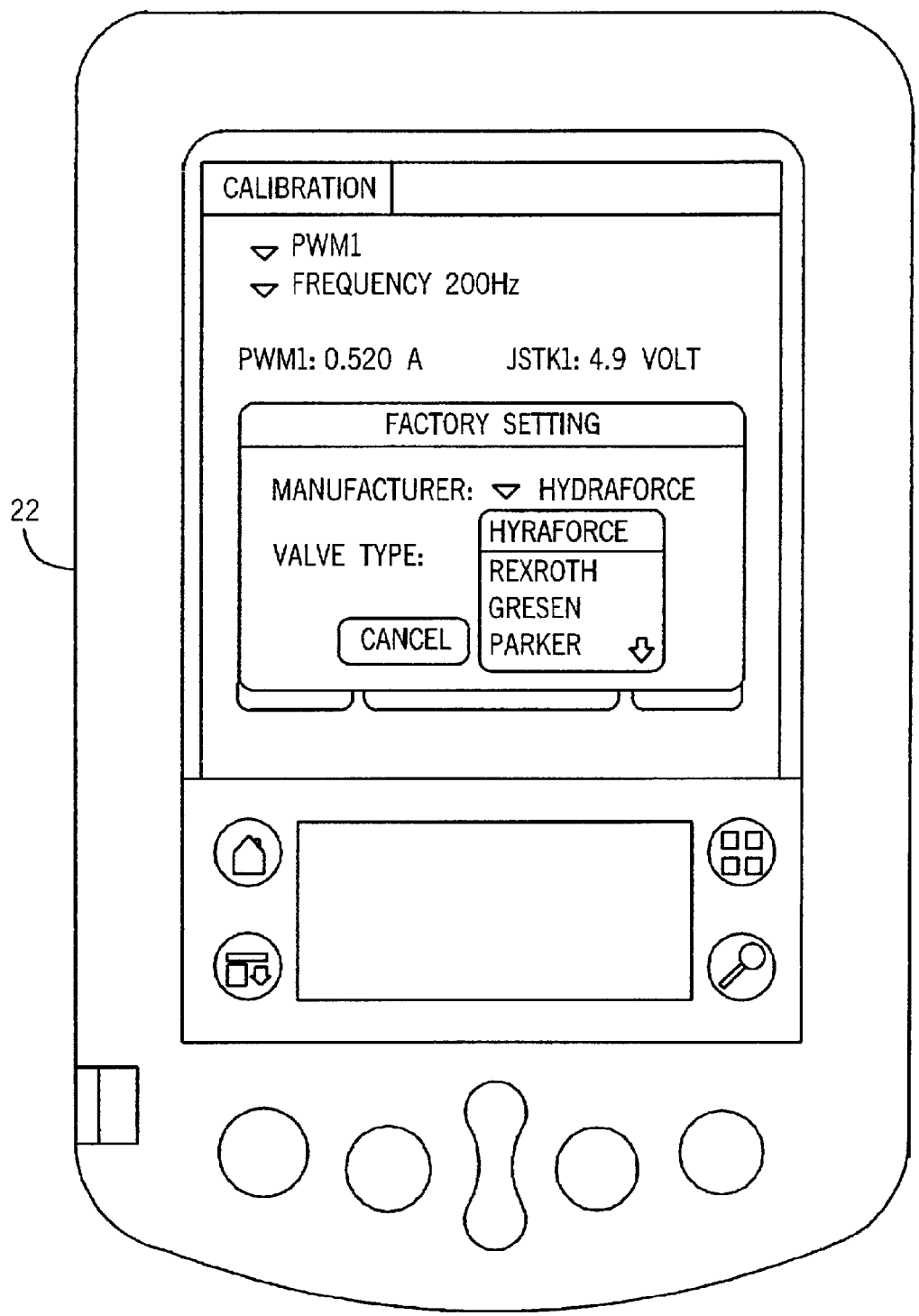

FIG. 6 illustrates an identification parameter selected from a database of known manufacturers as part of the present invention. In this Figure, identification parameters are selected. In this case, the manufacturer of a particular output control device is selected in this case in a pull-down menu such that one manufacturer may be selected from a list of known manufacturers. Such information is then stored in storage and communication device 22.

Figure 7:
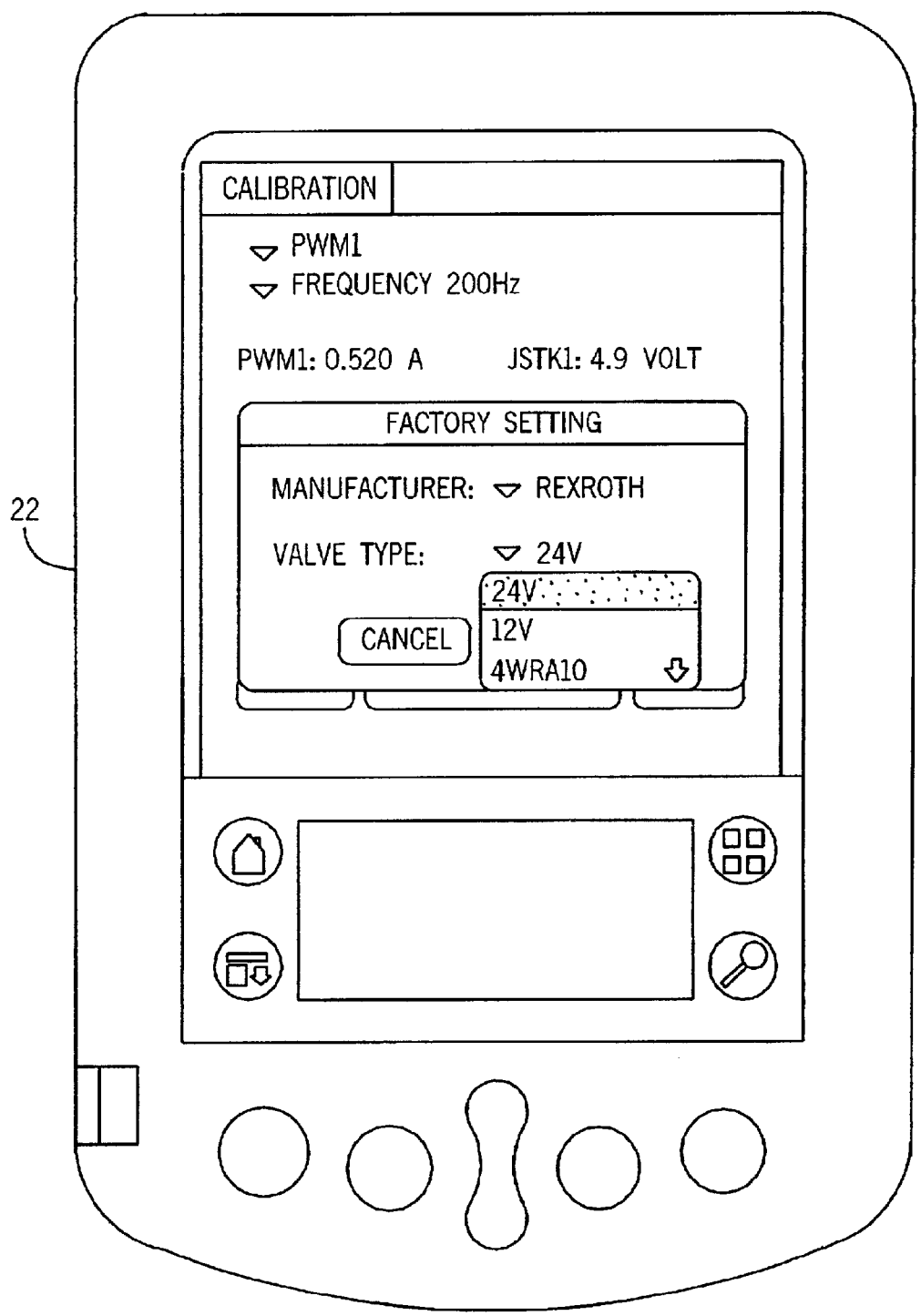

FIG. 7 illustrates a selection of an identification parameter selected from stored values for valve types of a given manufacturer for use in the present invention. In a similar fashion, as the manufacturer selection, another identification parameter such as valve type, may be selected from a pull-down menu which includes a list of known valve types for a particular manufacturer of a control output device. After selection, the valve type is stored in data storage and communication device 22. In this manner, given that the manufacturer and valve type are selected, the settings may be stored and used in the present invention to properly control the output control device of interest. Without the need for external calibration tools such as digital volt meters, frequency monitors or oscilloscopes. Such dynamic changeability also eliminates the need to stock pre-configured controllers for use with the present invention.

Figure 8:
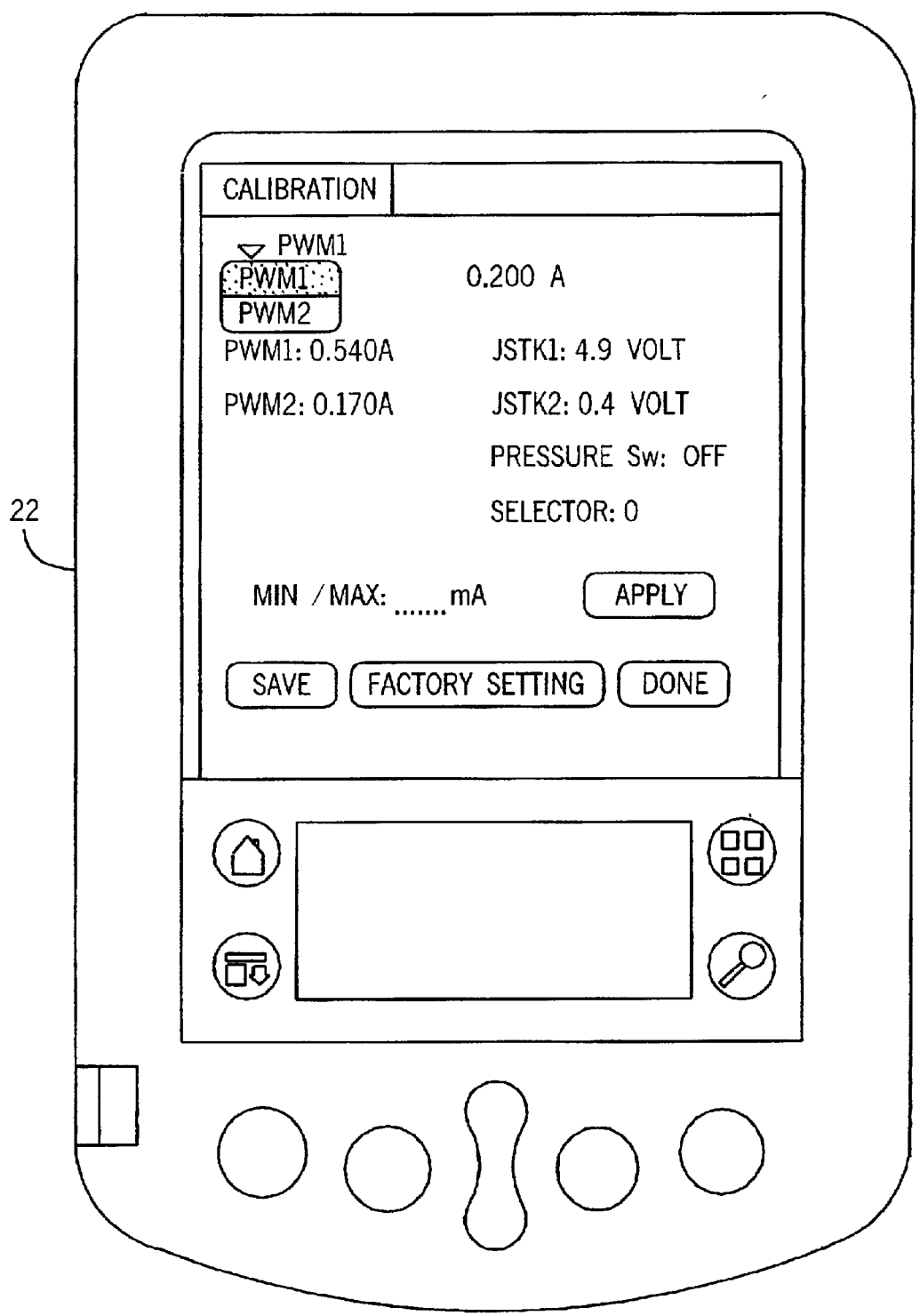

FIG. 8 illustrates a selection of a pulse width modulation channel in operation of the software of the present invention. In the embodiment shown, the pull-down menu consists of a selection of one of two pulse width modulation channels in data storage and communication device 22. Further calibration of each of these channels can then be instituted.

Figure 9:
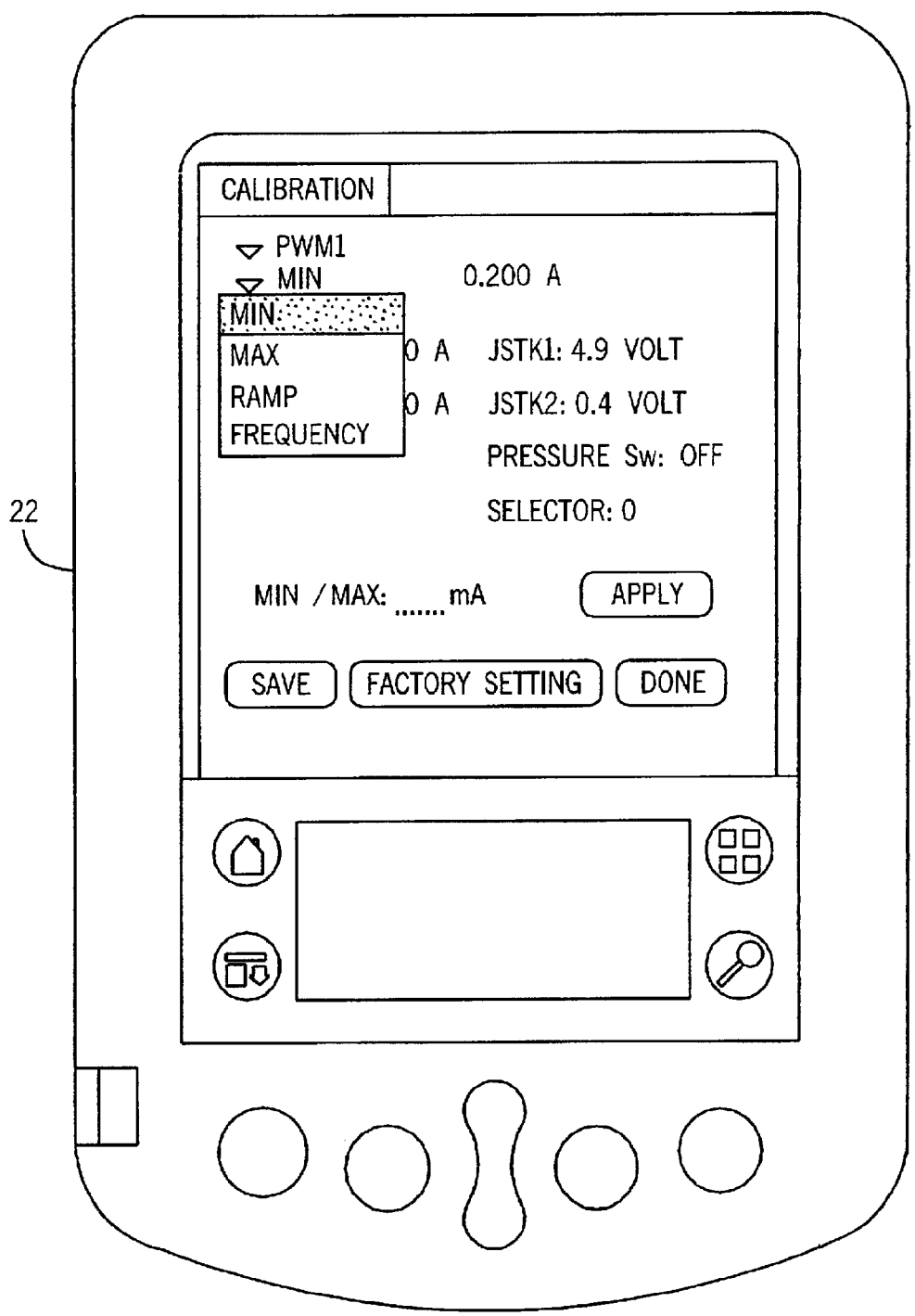

FIG. 9 illustrates the selection menu of operational parameters for use of the software in the present invention. For a particular pulse width modulation channel, several operational parameters may be selected in data storage and communication device 22. These operational parameters include minimum values, maximum values, ramp times and frequency. Other operational parameters may be included. These operational parameters define how the particular devices will operate and within what limits and at what particular values the control input devices and control output devices will perform.

Figure 10:
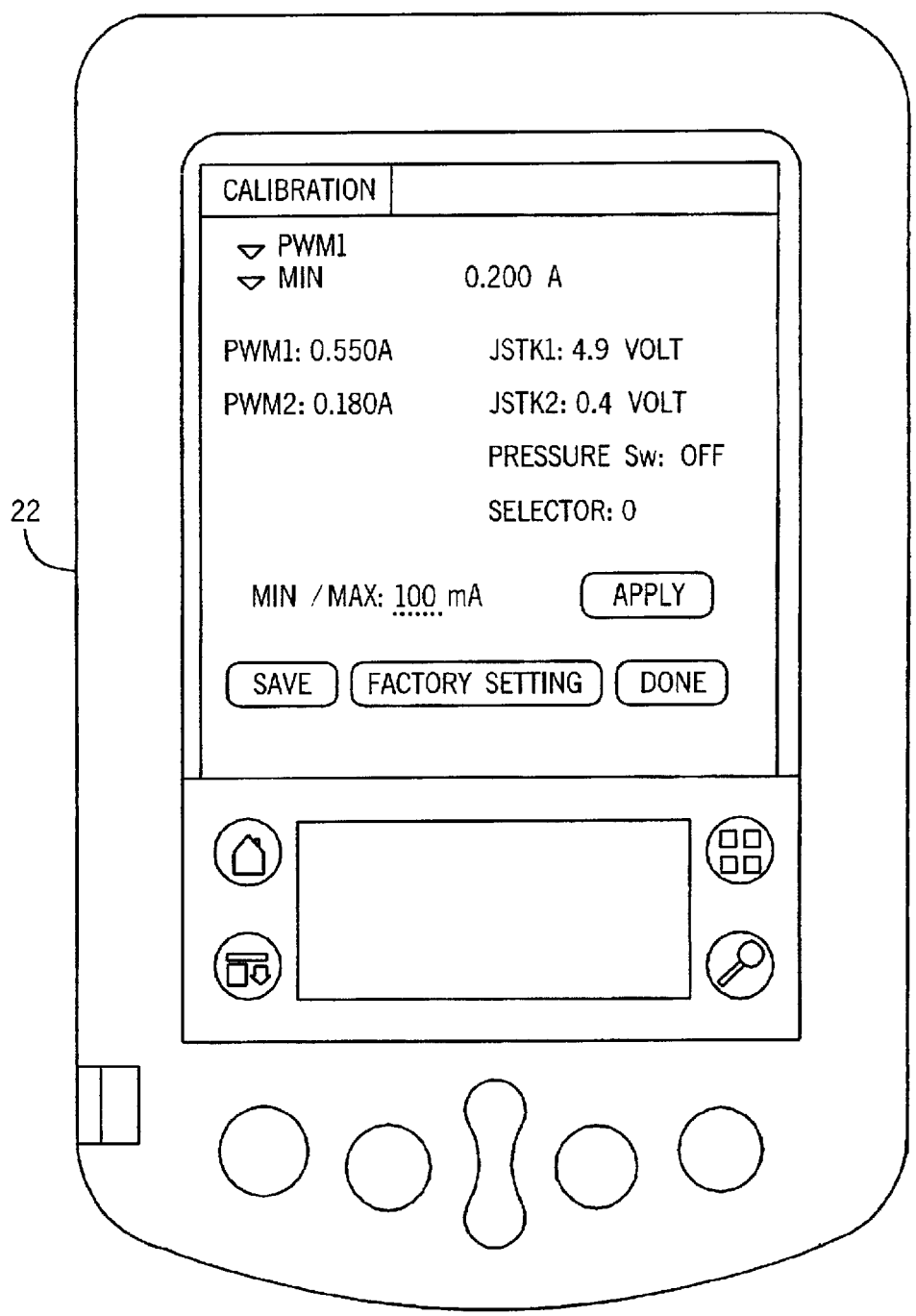

FIG. 10 illustrates the input of a particular operational parameter in the present invention. In this Figure, a minimum current is being changed from 200 milliamps to 100 milliamps for the first pulse width modulation channel. Data storage and communication device 22 will then store the 100 milliamp minimum current for PWM1.

Figure 11:
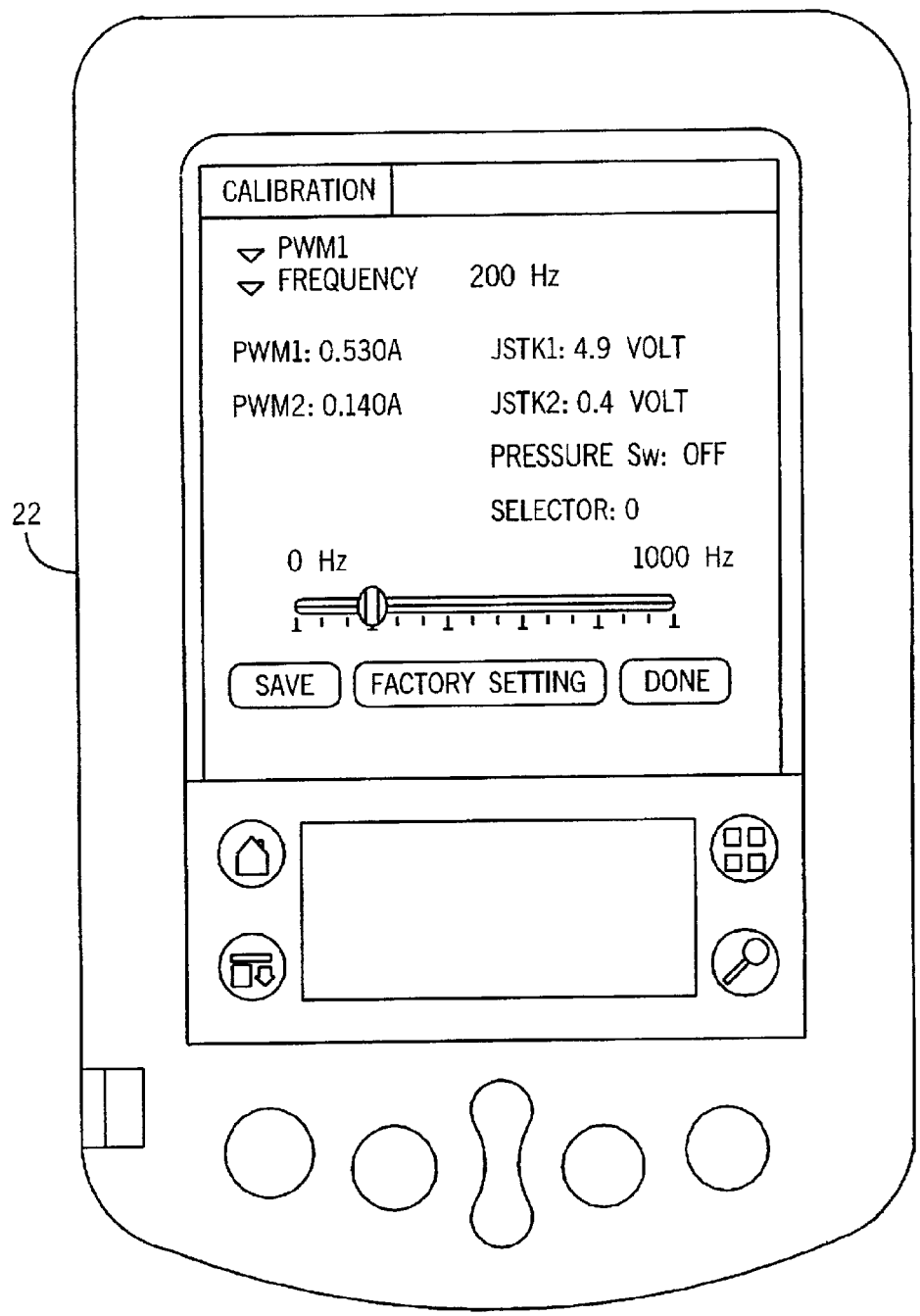

FIG. 11 illustrates the input of a particular operational parameter in the present invention. The software of the present invention also allows for the adjustment of another operational parameter, in this case operational frequency. As shown, the frequency may be varied from 0 hertz to 1,000 hertz and is set as shown at 200 hertz. This value may be saved into the data storage and communication device 22 and such a value will be brought up for the particular channel selected.

FIG. 12 illustrates the input of a particular operational parameter in the present invention. In this screen shot, the ramp time operational parameter is being set. In this example, a ramp time between zero and two seconds is possible and is currently selected as one second. Again, this ramp time will be saved in the data storage and communication device 22 and changed as necessary.

FIG. 13 illustrates operational parameter information in accordance with the present invention. FIG. 13 shows the current calibration settings for the four pulse width modulation channels shown including current settings, voltage settings, pressure switch conditions and particular selectors. Different operational and identification parameters may be selected and saved or factory settings may be selected as desired and applied. Additionally, such changes may be made dynamically while the data storage and communication device 22 is connected to the control input device and control output devices of the current invention.

FIG. 14 is a flowchart illustrating one methodology associated with the present invention. FIG. 14 illustrates an exemplary methodology of using the present invention. At the start of the process 50, the initial software is programmed and installed into the data communication storage device as indicated by step 52. Once the software is installed, it is not necessary to re-install it prior to its use over each system. However, additional information including additional manufacturers and updates may be desired. Again, the data communication storage device may be a PDA, PC or other communications-type device. The programming of the data communication storage device includes programming to receive, store and select operational parameters of a plurality of control input devices and a plurality of control output devices, programming to receive, store and select identification parameters of the control input devices and the control output devices; and programming to calibrate the industrial device based on the operational parameters and the identification parameters of the input control devices and the output control devices. Following the programming and installation of the software in step 54 the data communication storage device is connected to the appropriate driver and controllers for example. In some embodiments, the data communication storage device may also be connected directly to the output control device, the input control device or any other components in the overall system. When it is desired to initiate the program, the software may be run on the data communication storage device in step 56 by initiating the operating system of the particular device being used. For example, in a PDA an icon may be selected from the initial menu screen. During the running of the software, it is possible that step 58 to select, set and/or store certain identification parameters, for example product manufacturer names, such that proper operation of the system for the particular manufacturer may be achieved. Also at step 60 selection, setting and storing of operational parameters, including minimum and maximum currents, ramp times and frequencies can also be entered into and stored within data communication storage device. The system will then operate at step 62 as per its design in order to control a particular control output device, perform monitoring, diagnostic and display of current conditions, such information being available on the data communication and storage device. During operation, it will be necessary to determine at step 64 whether or not it is desired to change any of the selected identification parameters or operational parameters. If not, operations may continue at step 66 as normal. If so 68, it is then possible to, as part of the dynamic modification system 70 to again, if desired, select additional identification parameters, change those parameters. The same is possible with the operational parameters. In this manner, a continuous real time setting of appropriate levels is achieved for the desired operation of the system. This sequence is possible during operation. When operation is not complete 72, the current operation continues 62 with the possibility of further changes being implementable. When the operation is complete 74, the processed ends for the particular system of interest.

The present invention has been described in terms of the preferred embodiment, and it is recognized that equivalents, alternatives, and modifications, aside from those expressly stated, are possible and within the scope of the appending claims.

What is claimed is:

1. A method for controlling an output device comprising:
   programming a data and communication storage device to receive, store and select operational parameters of a plurality of control input devices and a plurality of output devices;
   programming the data and communication storage device to receive, store and select identification parameters of the control input devices and the output devices; and
   programming the data and communication storage device to calibrate a driver/controller based on the operational parameters and the identification parameters of the input control devices and the output devices.

2. The method of claim 1 wherein the operational parameters include an output device current value.

3. The method of claim 1 wherein the operational parameters include an input device value.

4. The method of claim 1 wherein the identification parameters include a manufacturer of the input control device.

5. The method of claim 1 wherein the identification parameters include a manufacturer of the output control device.

6. The method of claim 1 wherein the identification parameters include a product model number of the input control device.

7. The method of claim 1 wherein the identification parameters include a product model of the output control device.

8. The method of claim 1 wherein the input control device is a joy stick.

9. The method of claim 1 wherein the input control device is a pressure transducer.

10. The method of claim 1 wherein the output control device is a hydraulic valve.

11. The method of claim 1 wherein the output control device is a pneumatic valve.

12. The method of claim 1 wherein the output control device is a DC motor.

13. The method of claim 1 wherein the output control device is an electric circuit.

14. The method of claim 1 further including storing the programming in a personal digital assistant.

15. The method of claim 1 further including storing the programming in a personal computer.

16. A system for controlling an output device usable with machinery comprising:
   a data storage and communications device;
   a control input device;
   a control output device; and
   a driver-controller connected to the data storage and communications device, the control input device and the control output device for driving and controlling the control output device;

wherein the data storage and communication device can dynamically change data with respect to the control input device and the control output device based on desired operation.

17. A method of controlling an output device usable with machinery comprising:

programming a data and communication storage device to receive, store and select operational parameters of a plurality of control input devices and a plurality of output devices;

programming the data and communication storage device to receive, store and select identification parameters of the control input devices and the output devices;

programming the data and communication storage device to calibrate a driver/controller based on the operational parameters and the identification parameters of the input control devices and the output devices;

selecting on the data storage and communications device a specific control input device;

selecting on the data storage and communications device a specific control output device;

selecting at least one of the identification parameters and operational parameters for the control input device;

selecting at least one of the identification parameters and operational parameters for the control output device;

operating the control input device and the control output device with the selected identification parameters and operational parameters.

18. The method of claim 17 further including dynamically changing at least one of the input control device, output control device, identification parameters and operating parameters during operation of the machinery.

19. The method of claim 17 further including modifying the identification parameters for one of the control input device and the control output device.

20. The method of claim 17 further including modifying the identification parameters and the operational parameters for one of the control input device and the control output device.

* * * * *